United States Patent [19]

Ernst et al.

[11] 4,181,375

[45] Jan. 1, 1980

[54] ROLLER BEARING WITH ROLLING ELEMENTS HAVING CONCAVE CENTER PARTS AND CONVEX END PARTS

[75] Inventors: Horst M. Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Fed. Rep. of Germany

[73] Assignee: SKF Kugellagerfabriken GmbH, Schweinfurt, Fed. Rep. of Germany

[21] Appl. No.: 902,447

[22] Filed: May 3, 1978

[30] Foreign Application Priority Data

May 11, 1977 [DE] Fed. Rep. of Germany ... 7714897[U]

[51] Int. Cl.$^2$ .............................................. F16C 29/06
[52] U.S. Cl. .................... 308/6 C; 308/215
[58] Field of Search ............... 308/6 B, 6 C, 6 R, 215; 64/23.7

[56] References Cited

U.S. PATENT DOCUMENTS

| 3,246,933 | 4/1966 | Better | 308/6 C |
| 3,466,101 | 9/1969 | Hudson | 308/6 C |
| 3,606,499 | 9/1971 | Ganser et al. | 308/6 C |
| 3,704,919 | 12/1972 | Titt | 308/6 C |
| 3,751,121 | 8/1973 | Geffner | 308/6 C |

FOREIGN PATENT DOCUMENTS

2264100 7/1973 Fed. Rep. of Germany.

*Primary Examiner*—Douglas C. Butler
*Attorney, Agent, or Firm*—Daniel M. Rosen

[57] ABSTRACT

In a rolling bearing for linear movement with respect to a shaft, the bearing has a sleeve, and axially extending guide rails on the inner and outer surfaces of the sleeve. Rolling elements are guided by the guide rails, and have concave spool-like central portions matched to the shaft, to provide linear contact therewith. The ends of the rolling elements are convexly curved to match the curvature of the inner surface of the sleeve, so that the inner surface of the sleeve forms a raceway for rolling elements under load. Grooves are provided in the lateral surfaces of the guide rails for guiding balls disposed between the ends of adjacent rolling elements. End caps on the bearing have turn-around guides for directing rolling elements between the inner raceways and the raceways for unloaded rolling elements along the outer surfaces of the sleeve.

10 Claims, 2 Drawing Figures

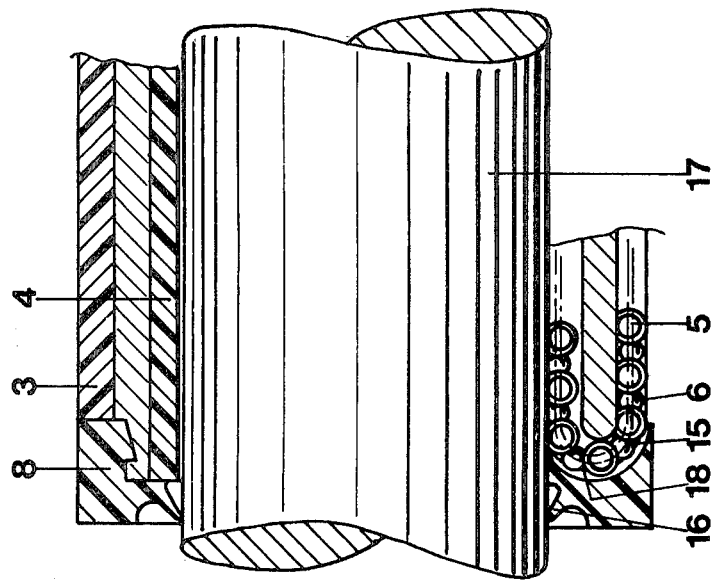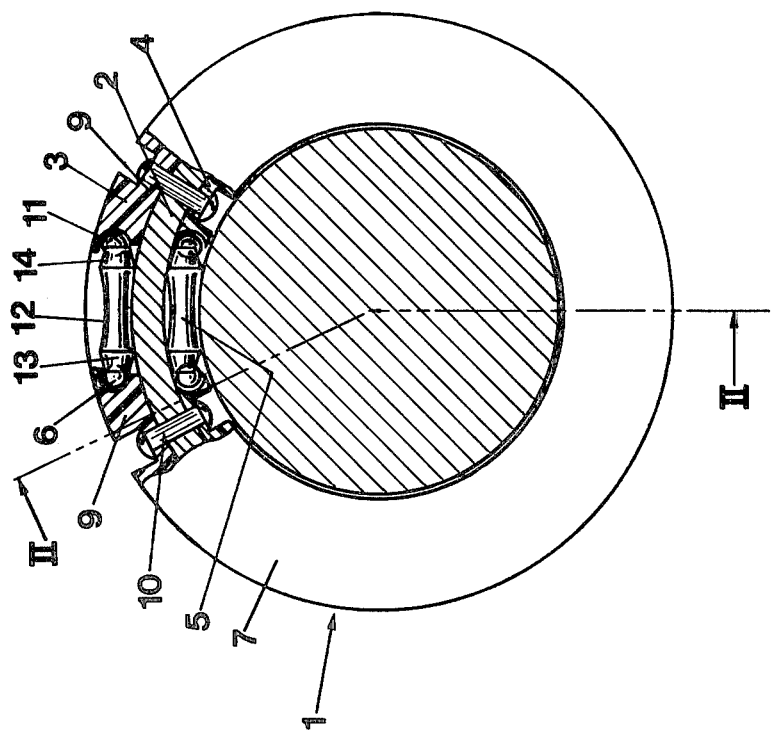

ROLLER BEARING WITH ROLLING ELEMENTS HAVING CONCAVE CENTER PARTS AND CONVEX END PARTS

BACKGROUND OF THE INVENTION

This invention relates to a rolling bearing for relative linear motion between the bearing and a cylindrical machine element, such as a shaft. The invention is more particularly directed to bearings of this type having a plurality of closed circular courses of spool-shaped rolling members distributed over the periphery of a mutisectional annular member. The rolling members have a concave rolling surface so that they are in linear contact with the cylindrical machine element, while the annular member contains a sleeve. Sections of the inner surface of the sleeve serve as linear raceway for support of the loaded rolling members, and sections of the outer surface of the sleeve serve as linear raceway for the return of the unloaded rolling members.

Such a rolling bearing is disclosed for example in U.S. Pat. No. 3,704,919. The spoolshaped rolling members disclosed therein have concave central rolling surfaces, lateral barrel-shaped end pins, and cylindrical intermediate sections for guiding the rolling members at equal distances apart in an endless chain-like band. Aside from the fact that guidance of the rolling members by a band of this kind is relatively costly, roll-off of the rolling members, due to sliding friction between the latter and the individual links of the band, in influenced unfavorably.

German Pulished Application DT-AS 2,264,100 further discloses a rolling bearing having only one closed circular course of cylindrical rolling members. This bearing is adapted to be inserted between two parallel surfaces, at least one of which is linearly displaceable in relation to the other. In this known rolling bearing the rolling members are provided with cylindrical end pins which engage endless guide grooves, while spacer balls are arranged between the pins. Here use of the spacer balls improves the friction ratios in comparison with the device disclosed in U.S. Pat. No. 3,704,919. Since only rolling friction, which is known to be lower than sliding friction, exists between the rolling members.

BRIEF SUMMARY OF THE INVENTION

The present invention is directed to a further development of a rolling bearing for relative linear motions on a shaft, of the type outlined above, wherein the frictional resistance within the rolling bearing is decreased and the manufacturing costs reduced.

This object is achieved in simple fashion by the present invention, wherein the rolling members have pins on both ends thereof. The peripheral surface, in addition, beginning from the concave rolling surface of the rolling members and in the direction of the axis thereof, is curved to match the inside diameter of the sleeve. Spacer balls are also provided between the end pins of adjacent rolling elements. The balls in each instance engage guide rails arranged at both sides of the rolling members in the rectilinear section of the circular course and in the regions of the inner and outer surfaces of the sleeve.

Such a design of a roller bearing of relative linear motions advantageously achieves utilization of the relatively high bearing capacity of rolling members, whose rolling surface matches the curvature of the shaft. In addition, a considerable reduction in the frictional resistance of said rolling members is obtained. Last, but not least, the multisectional design of the rolling bearing permits the individual parts thereof to be manufactured economically.

BRIEF FIGURE DESCRIPTION

In order that the invention will be more clearly understood, it will now be disclosed in greater detail with reference to the accompanying drawing, wherein:

FIG. 1 is a partially cross sectional view of one axial end of a bearing in accordance with the invention; and FIG. 2 is a longitudinal cross sectional view of a portion of the bearing of FIG. 1, taken along the lines II—II.

DETAILED DISCLOSURE OF THE INVENTION

The rolling bearing shown in the drawing consists of an annular member 1, comprised essentially of a sleeve 2, and a plurality of guide rails 3 and 4 with arcuate cross sections. Rolling members 5 are guided between the rails by means of spacer balls 6. Two sealing rings 7 and 8 are provided at the ends of the bearing. The annular member 1, in the illustrated embodiment of the invention has six segmentary sections 9, which are distributed at equal distances apart in peripheral direction of the annular member, and are made up of pairs of outer and inner guide rail 3 and 4 radially facing one another.

The guide rails 3,4 forming the sections 9 are tightly joined together by means of a plurality of rivets 10 extending through the sleeve, though other expedient connecting means, such as screws, may alternatively be employed. In addition, a guide groove 11 having a circular cross section, is formed in the two longitudinal sides of each of the guide rails 3,4.

The elongated rolling members 5 each have a concave central rolling surface 12, to which is joined, on either end, pins 13 and 14. The peripheral surface of the pins, in each instance, beginning from the terminal sections of the rolling surface 12, is convex curved in the direction of the axis of the rolling members 5, to match the inside diameter surface of the sleeve 2. The sealing rings 7 and 8 are arranged on the two end faces of the annular member 1. The rings engage hook-like recesses in the sleeve 2, and have six reversing channels 15, corresponding to the number of sections 9, for the rolling members 5. In the side faces of each reversing channel 15 there is provided, as in the case of the guide rails 3,4 an annular groove 18 having a circular cross section. In addition, a sealing lip 16 is formed on the inner side of the sealing rings 7,8 for sealing the rolling bearing against a shaft 17.

The individual closed circular courses for the rolling members 5 are thus in each instance comprised of a rectilinear outer section, made up of two guide rails 3 facing one another, a reversing channel 15 as one end of the bearing, a rectilinear inner section, made up of two guide rails 4 facing one another, and a reversing channel 14 at the other end of the bearing (the latter not being represented in the drawing). A portion of the inner surface of the sleeve 2 thereby serves, in each instance, as a linear raceway for support of the loaded rolling members 5 by means of their pins 13, 14, and a portion of the outer surface of the sleeve serves as linear raceway for return of the unloaded rolling members 5.

The guide rails 3,4 and the sealing rings 7,8 are comprised preferably of synthetic material, although other materials are likewise possible. For example, for the guide rails 3,4 drawn profile sections of aluminum or steel may alternatively be advantageously used. In addition, the sealing rings 7,8 may be joined to the guide rails by ultrasonic welding or by bonding.

In the arrangement of the invention, as above described, it is thereby apparent that the rolling elements have concave central portions, and convex end portions, with the radii of curvature of the end portions being greater than that of the central portion. In addition, it is apparent that the generatrices of the central and end portions have common centers of curvature, so that line contact occurs between the shaft and the rolling elements, and between the inner surface of the sleeve 2 and the rolling elements.

In addition, it is to be noted, as shown in FIG. 1, that the axially extending guide rails 3,4 may have axially extending grooves for receiving the rivets 10, and that these guide rails may hence by employed to serve in common as the guide rails of adjacent sides of adjacent rows of rolling elements, as illustrated.

While the invention has been disclosed and described with reference to a single embodiment, it will be apparent that variations and modifications may be made therein, and it is therefore intended in the following claims to cover each such variation and modification as follows within the true spirit and scope of the invention.

What is claimed is:

1. In a rolling bearing for linear movement along a curved surface, including an annular member, a plurality of rolling elements having concave rolling surfaces with curvatures for linearly contacting said curved surface, said annular member having a sleeve and a means for guiding said rolling elements to roll in endless rows including at least one axially directed course on the inside of said sleeve for loaded elements and a corresponding axially directed return course on the outside of said sleeve for unloaded elements; the improvement wherein said rolling elements have convexly curved rolling surfaces immediately joined to said concave rolling surfaces, said convex surfaces matching the inside diameter of said sleeve, said means for guiding comprising axially extending guide rails on the inner and outer surfaces of said sleeve, and further comprising a spacer ball engaging said guide rails and the convexly curved rolling surfaces of each adjacent pair of rolling elements, between each convex end of adjacent rolling elements, for spacing said rolling elements with respect to one another in the axially extending raceways defined between said guide rails.

2. The rolling bearing of claim 1 wherein said guide rails have guide grooves of circular cross section in their lateral edges for receiving and guiding said spacer balls.

3. The rolling bearing of claim 1, wherein said guide rails are affixed to the inner and outer surfaces of said sleeve by fastening means extending transversely through said sleeve.

4. The rolling bearing of claim 3 wherein said fastening means comprises rivets, the corresponding guide rails on the inner and outer surfaces of said sleeve being held by common fastening means.

5. The rolling bearing of claim 1 wherein said guide rails are sections of a synthetic material.

6. The rolling bearing of claim 1 wherein said guide rails are of aluminum.

7. The rolling bearing of claim 1 wherein said guide rails have guide grooves for guiding said spacer ball, and said convex rolling surfaces are substantially free of said grooves.

8. The rolling bearing of claim 1 wherein said guiding means comprise a plurality of axially extending elements affixed to the inner and outer surfaces of said sleeve, said axially extending elements being circumferentially spaced apart to define guide courses for the rolling elements.

9. The rolling bearing of claim 8 wherein said axially extending elements have guide grooves in their lateral wall, said guide grooves receiving said spacer ball for guiding said rolling elements.

10. The rolling bearing of claim 9 further comprising sealing rings affixed to the ends of said sleeve and having reversing channels for said rolling elements.

* * * * *

UNITED STATES PATENT AND TRADEMARK OFFICE
CERTIFICATE OF CORRECTION

PATENT NO. : 4,181,375
DATED : January 1, 1980
INVENTOR(S) : Ernst et al

It is certified that error appears in the above-identified patent and that said Letters Patent are hereby corrected as shown below:

Column 1, line 32, Change "Pulished" to --Published--.
Column 1, line 42, Change " .Since" to --, since --.

Signed and Sealed this

Tenth Day of June 1980

[SEAL]

Attest:

SIDNEY A. DIAMOND

Attesting Officer

Commissioner of Patents and Trademarks